United States Patent [19]

Hansen

[11] 4,440,191

[45] Apr. 3, 1984

[54] FLOW CONTROL DEVICE

[75] Inventor: Kenneth P. Hansen, Enfield, Conn.

[73] Assignee: United Technologies Corporation, Hartford, Conn.

[21] Appl. No.: 421,760

[22] Filed: Sep. 23, 1982

[51] Int. Cl.³ .............................................. G05D 7/01
[52] U.S. Cl. ..................................... 137/468; 137/501
[58] Field of Search ............... 137/468, 500, 501, 503, 137/504

[56] References Cited

U.S. PATENT DOCUMENTS

| | | | |
|---|---|---|---|
| 2,622,614 | 12/1952 | Cox | 137/500 |
| 2,750,929 | 6/1956 | Bronson | 137/505.13 X |
| 3,332,436 | 7/1967 | Welty | 137/468 |
| 3,643,685 | 2/1972 | Hays | 137/501 |
| 3,724,494 | 4/1973 | Alber | 137/501 |

FOREIGN PATENT DOCUMENTS 2347316  9/1973  Fed. Rep. of Germany ...... 137/501

Primary Examiner—Robert G. Nilson
Attorney, Agent, or Firm—John Swiatocha

[57] ABSTRACT

A flow control device includes metering and pressure regulating elements (70 and 95) disposed one within the other and movable independently of one another for accurate maintenance of a constant pressure drop across the metering valve at a fixed temperature. Bimetallic elements (145) adjust the position of the pressure regulating element in response to the temperature of the fluid to compensate for variations therein. The pressure regulating valve element is grounded to the housing (10) of the flow control device in part for ease in adjusting the preload of a spring (130) which balances the pressure regulating element against fluid pressures applied to opposite ends thereof. The metering element is positionable by the controlled application of servo fluid to a single end thereof.

9 Claims, 1 Drawing Figure

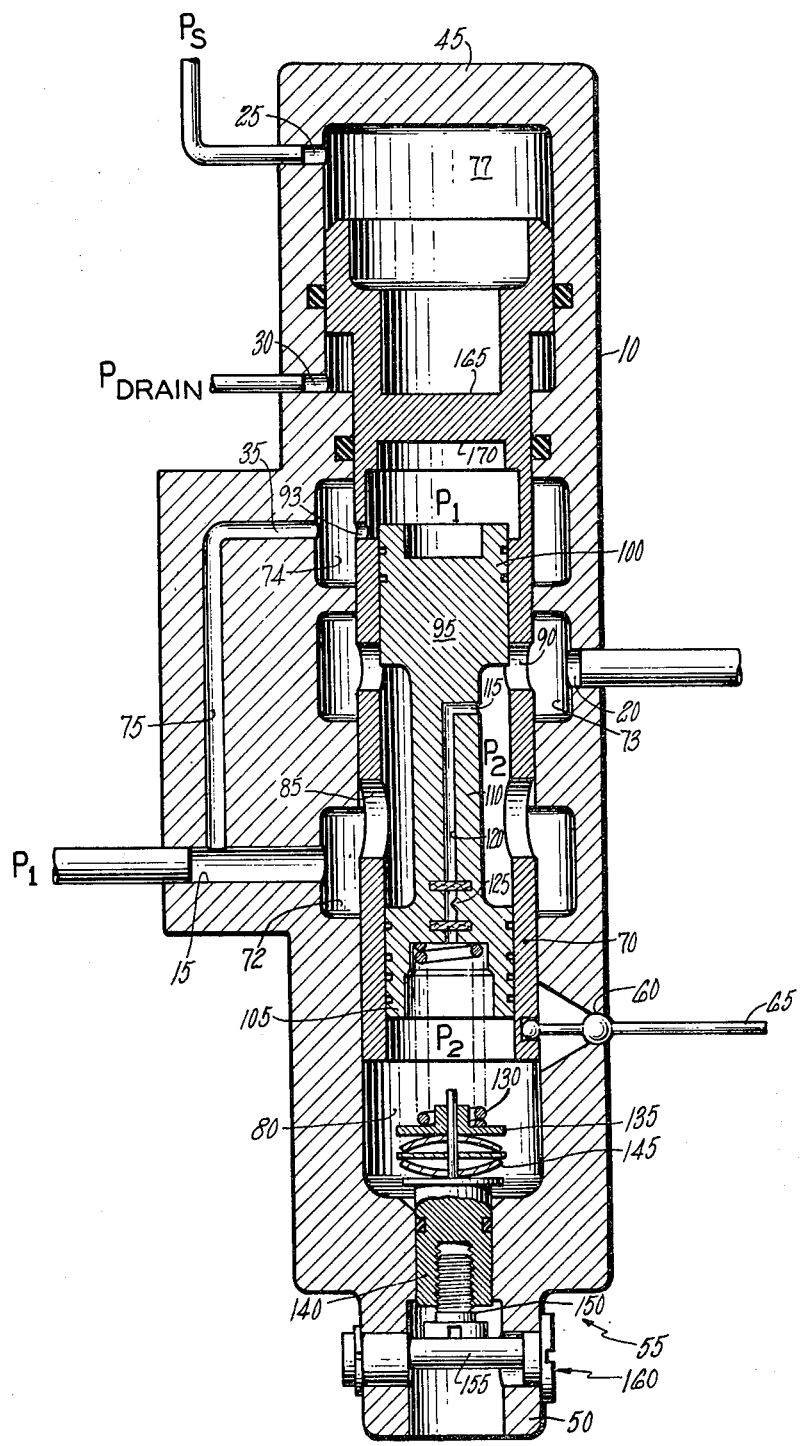

FLOW CONTROL DEVICE

CROSS REFERENCE

This invention relates to U.S. pat. application Ser. Nos. 421,758 and 421,759, filed of even date therewith.

DESCRIPTION

1. Technical Field

This invention relates in general to flow control devices and specifically to such a device which establishes a desired volumetric fluid flow rate in response to an adjustment in flow area while the pressure drop across the device is held constant.

2. Background Art

It is well known that fluid flow rate through a conduit depends on both the flow area of the conduit and the pressure drop thereacross. Accordingly, in establishing a desired fluid flow rate by means of a flow control device, it is necessary to regulate not only the cross-sectional flow area of the device, but also the pressure drop thereacross. In apparatus such as hydromechanical fuel controls for aircraft gas turbine engines, it is desirable to vary engine fuel flow in response to an input to the fuel control, such input being, for example, movement of a linkage or the like by a corresponding movement of a pilot's power lever or similar control input device. In the past, it has been the practice to provide such hydromechanical fuel controls with a throttle (metering) valve and a pressure regulating valve, each housed separately in its own casing. Typically, the pressure regulating valve maintains a constant pressure drop across the throttle valve so that a desired flow may be obtained by control of a single variable: flow area. Under constraints of limited space, as where the fuel control is employed in a missle or the like, it has been found that utilization of throttle and pressure regulating valves in separate casings entails and inefficient extension of the overall volume of the control and therefore, cannot be tolerated. While it is known from U.S. Pat. No. 2,750,929 to Bronson, to combine multiple valve elements in a single housing or casing, the Bronson device, for various reasons, is not suitable for use as a flow controller in such applications as gas turbine engine fuel controls.

Improved flow control devices suitable for use in gas turbine engine fuel controls are disclosed and claimed in U.S. pat. application Ser. Nos. 421,758 and 421,759, filed of even date herewith. As disclosed in these applications, such flow control devices employ a pressure regulating valve element received interiorly of a metering valve element, the pressure regulating valve element holding a relatively constant pressure drop across the device so that flow therethrough is controllable by setting the metering valve element only. By the present invention, the ability of a flow controller having a pressure regulating valve element interiorly of a metering valve element to maintain a constant pressure drop thereacross, and to accurately control the flow therethrough of fluids of various densities, is enhanced. The compactness and economy of construction of such a flow controller are also enhanced by the present invention.

DISCLOSURE OF INVENTION

It is an object of the present invention to provide a compact flow control device wherein the pressure drop across the device is maintained constant at constant fluid temperature with enhanced accuracy.

It is another object of the present invention to provide such a flow control device with means for readily adjusting the device for use with fluids of varying density.

It is another object of the present invention to provide a compact flow control device wherein the pressure drop across the device is accurately adjusted as a function of fluid temperature to maintain a constant flow rate under conditions of changing fluid density due to conditions of changing temperature.

It is another object of the present invention to provide such a flow control device with the characteristics of enhanced compactness and economy of construction.

In accordance with one aspect of the present invention, a flow control device comprises an adjustable metering valve element and, received therewithin and independently movable with respect thereto, a pressure regulating valve element, adjustment of the flow area of the passage containing the metering valve element resulting in an analogous adjustment of the flow area of the passage containing the pressure regulating valve element. This relationship between the valve elements and the flow areas associated therewith causes the pressure of the regulated flow to follow the pressure of the metered flow for enhancing the maintenance of a constant pressure drop across the device as well as for enhancing the accuracy of the adjustment in pressure drop in response to varying density (temperature) conditions.

In accordance with another aspect of the present invention, the pressure regulating valve element is biased by a spring, the preload of which may be adjusted from the exterior of the flow control device for ease in adjusting the device to accommodate fluids of varying density.

In accordance with yet a further aspect of the present invention, adjustment of the position of the metering valve element is effected in an uncomplicated and economical manner by actuation of this member from only a single end thereof, actuation forces being balanced by forces resulting from various pressures internal to the flow control device.

BRIEF DESCRIPTION OF DRAWING

The sole FIGURE is a view in partial cross section of the flow control device of the present invention.

Best mode for Carrying Out the Invention and Industrial Applicability

Referring to the drawing, the flow control device of the present invention comprises a housing (casing) 10 provided with inlet and outlet ports 15 and 20, respectively, and hydraulic fluid ports 25, 30 and 35. As shown, housing 10 may be generally cylindrical, being closed at end 45 thereof and open at opposite end 50 to receive a spring preload adjuster 55 therethrough. Housing 10 also includes an opening at 60 to receive therethrough a feedback link 65 pinned to the housing and metering valve element 70 for pivotal movement with respect thereto. The position of link 65 is indicative of the setting of the metering valve element. The link may be connected to any suitable transducer such as the movable core of a suitably energized linearly variable differential transformer (not shown) for providing an electrical signal the magnitude of which is indicative of the setting of the metering valve element.

Fluid input to the flow control device from inlet passage 15 flows through an annular extension 72 of the inlet passage and is exhausted from the device through annular extension 73 of outlet passage 20. Similarly, port 35 is provided with an annular extension 74 communicating therewith. Port 35 communicates with inlet passage 15 via passage 75. Port 30 communicates with drain pressure, $P_{drain}$.

Metering valve element 70 is received within housing 10 defining therewith, at the ends thereof, chambers 77 and 80. Element 70 may be positioned by selective pressurization of chamber 77 with metered servo fluid in a manner to be described in greater detail hereinafter. As shown, metering valve element 70 is of generally hollow, cylindrical shape and is provided with at least one inlet window 85 in fluid communication with annular passage 72 for pressurization of the interior of the metering element with fluid provided through inlet port 15. Any number of plural inlet valve windows 85 may be employed as dictated by desired valve size and required flow capacity. Such a plurality of windows would be disposed circumferentially about the valve element in alignment with the window illustrated and in communication with annular passage 72.

Metering element 70 also includes at least one outlet window or opening 90 in fluid communication with a second annular passage 73 for accommodating flow exhausted from the interior of metering element 70 to outlet port 20. It will be understood that any number of outlet windows 90 may be employed in circumferential alignment with the illustrated window as dictated by valve size and flow accommodation requirements. Port 93 is provided in metering element 70 for applying further fluid inlet pressure to another portion of the interior of the metering valve element for reasons which will become more evident hereafter.

A pressure regulating valve element 95 is disposed interiorly of metering valve element 70 and is longitudinally reciprocable therewithin. Pressure regulating valve element 95 may be a spool-type valve element including at the ends thereof, a pair of spaced, cup-shaped lands or spools 100 and 105 disposed at opposite ends of a reduced diameter, median portion 110. A first portion (land 100) of valve element 95 is disposed in variable registry with the outlet window(s) 90 in metering valve element 70. Median portion 110 is bored at 115 and 120, these bores providing fluid communication between the interior of metering valve element 70 surrounding the median portion with the interior of land 105. Bore 120 may include a damping orifice 125 therein to lend stability to the pressure regulating valve element as it reciprocates within metering valve element 70. The interior of land 100 is pressurized with fluid at inlet pressure by means of communication of the interior of the upper portion of metering valve element 70 with port 35 which, as set forth hereinabove, communicates with inlet port 15 through passage 75 and port 93.

Pressure regulating valve element 95 is biased upwardly by a spring 130 interposed between the interior of land 105 and a spring retainer 135 which is slidably disposed on a retainer guide 140, itself received in the lower end of housing 10 and sealed thereto. A plurality of concavo-convex bimetallic discs 145 are disposed between retainer 135 and the base of guide 140 for adjusting the preload of spring 130 in response to the temperature of the fluid handled by the flow control device to maintain uniform performance in the face of changes in density due to variations in fluid temperature. Retainer guide 140 is provided with a cam follower such as screw 150 threaded into the end of the guide. Screw 150 engages a cam surface on a shank portion 155 of a slot headed rotary dial 160. Dial 160, screw 150 and spring guide 140 together form spring preload adjuster 55.

In operation, an input signal to the flow control device is provided by selected pressurization of chamber 75 with servo fluid at pressure $P_s$ through port 25. Such an input to the metering valve element causes a rectilinear movement thereof and such movement of the valve element 95 within housing 10 places the inlet valve window(s) 85 in select variable registry with annular passage 72 and inlet port 15 thereby modulating the effective flow area between passage 72 and the inlet windows. Pressurized fluid at pressure $P_1$ is provided by, for example, a suitable pump (not shown) and enters housing 10 through port 15, annular passage 72, inlet window 85 in valve element 95 and along the surface of the pressure regulating valve median portion 115 to outlet valve window(s) 90. Outlet valve window(s) 90 are dimensioned and located so as to remain unblocked by any portion of housing 10. Thus, the effective flow area of the flow control device is determined by the extent of registry of windows 85 with annular passage 72.

To accurately control fluid flow it is required to control not only flow cross-sectional area, but also pressure drop. In the present invention, the pressure drop across the inlet windows 85 (the registry between windows 85 and passage 72) is maintained at a constant value by pressure regulating valve element 95 whereby flow through the device is effectively controlled by a single input, the setting of metering valve element 70.

As set forth hereinabove, a first portion (land 100) of the pressure regulating element is disposed in registry with the interior of outlet window 90. Thus, pressure $P_2$ at the interior of metering valve element 70 between windows 85 and 90 (adjacent the interior of inlet windows 85) is determined by the amount of this registry or, in words, the amount of blockage of outlet windows 90 by land 100. Fluid pressure immediately upstream of windows 85 is essentially inlet pressure ($P_1$). To maintain a constant pressure drop across window 85, inlet pressure is applied to the interior (end face) of land 100 through port 15, passage 75, port 35, annular passage 74 and port 93 in metering valve element 70. Fluid pressure $P_2$ at the opposite side of window(s) 85 (immediately upstream of outlet windows 90) is applied to the interior (end face) of land 105 through bores 115 and 120.

It is seen that the pressure drop across the registry of inlet windows 85 with annular passage 72 is applied to opposite ends of the pressure regulating valve element and balanced by spring 130. In operation, assuming that a desired flow is being maintained by the flow control device and it is desired to increase the flow under conditions of constant supply pressure, additional servo fluid is admitted to chamber 77 thereby lowering metering valve element 70. This will increase the amount of registry between windows 85 and annular passage 72 thereby increasing flow through inlet windows 85. Since the pressure regulating valve element is grounded (connected) to housing 10 through spring 130, retainer 135, bimetallic discs 145 and guide 140, rather than to metering element 70, such movement of the metering valve element has substantially no effect on the positioning of the pressure regulating valve element 95. Outlet windows 90 are opended generally simultaneously with the opening of windows 85. In other words, the amount of opening of window 90 increases as the amount of overlap between windows 85 and annular passage 72 increases. Therefore, it is seen that supporting the pressure regulating valve element on the casing rather than the metering valve element allows independent longitudinal reciprocation of these elements so that the opening of inlet windows 85, which by itself would increase pressure $P_2$ adjacent the reduced portion 115 of the pressure regulating valve element, also effects opening of windows 90 to maintain pressure $P_2$ the pressure drop across the device at a constant level. The constant position held by the pressure regulating valve element (land 95 thereof) results from proper contouring of window(s) 85 in relation to window(s) 90. Thus, it will be seen that variations in flow set by adjustment of the metering valve element do not require variations in the loading of the pressure regulating element by spring 130 to maintain pressure drop $P_1$-$P_2$ constant. Since spring loading remains constant throughout a range of flows, proper adjustment in such loading effected by bimetallic elements 140 in response to fluid temperature (density) is achieved throughout the flow range (independently) of the setting of the metering valve element. Furthermore, it is known that continuous adjustments in the balancing of the pressure regulating element by a spring to hold a constant pressure drop can result in a decrease or "droop" in pressure drop with increasing flows. Independent reciprocation of the valve elements in the present invention minimizes such droop effects.

It will also be noted that grounding the pressure regulating valve element to the casing rather than the metering valve element allows the preload of spring 130 to be conventiently adjusted from the exterior of the casing to adjust the flow control device for fluids of varying densities. As shown in the drawing, rotary adjustment of dial 160 causes the cam surface of shank 155 to raise or lower screw 150 to raise or lower spring guide 140 and spring retainer 135 thereby adjusting the amount of spring compression.

It is seen that in the present invention, the lower ends of both the pressure regulating valve element and the metering valve element are pressurized with fluid at pressure $P_2$. It is also seen that the interior of the metering valve element above the pressure regulating valve element is pressurized with inlet (supply) pressure $P_1$. Accordingly, the servo pressure ($P_s$) acting on the upper end of the metering valve element at first reaction surface 165 is balanced by the pressure of the fluid handled by the flow control device acting on an opposite (second) reaction surface 170 obviating the need for provision of servo fluid pressurization at both ends of the metering valve element and the additional fluid handling hardware (conduits, seals, extended valve lap lengths etc.) which would be required in such an arrangement.

While the flow control device of the present invention has been illustrated and described with respect to a particular illustrative embodiment thereof, it will be appreciated that alternate embodiments will suggest themselves to those skilled in the art and it is intended of the following claims to cover such alternate embodiments as come within the true spirit and scope of this invention.

Having thus described the invention what is claimed is:

1. A flow control device comprising a housing having fluid inlet and fluid outlet passages therein, a first valve element disposed within said housing, a second valve element disposed within said first valve element, said first and second valve elements being disposed in selective communication with said inlet and outlet passages, said flow control device being characterized by:
    said first valve element comprising a metering element having inlet and outlet windows therein corresponding to, and communicating with said fluid inlet and outlet passages, respectively, said metering valve element being selectively positionable within said housing such that one of said windows is disposed in selectively variable registry with the corresponding passage for adjusting the effective flow area therebetween;
    said second valve element comprising a pressure regulating element having first and second ends thereof and including a first portion in variable registry with the other of said windows in said metering element for adjusting the flow therethrough; said pressure regulating valve element being grounded to said housing for movement independent of that of said metering element for enhanced accuracy in the maintenance of a constant pressure drop across said one metering valve window;
    means providing fluid communication between said corresponding passage and said second end of said pressure regulating element;
    means providing fluid communication between said one window on a side thereof opposite said corresponding passage and said first end of said pressure regulating element; and
    means for balancing said pressure regulating element against fluid pressure on said first and second ends thereof for establishing a registry between said other window and said first portion of said pressure regulating valve element necessary to maintain a relatively constant pressure drop across said one window.

2. The flow control device of claim 1 further characterized by:
    said metering element comprising a sleeve open at one end thereof and
    said means for balancing said pressure regulating element comprising a spring, said spring at one end thereof being connected to said housing and at the opposite end thereof being connected to said pressure regulating element, the connection of said spring to said pressure regulating element extending through the open end of said metering element.

3. The flow control device of claim 2 further characterized by said housing including a spring preload adjuster accessible from the exterior of said housing and connected to said spring for adjusting the reaction force applied by said spring to said pressure regulating element.

4. The flow control device of claim 3 characterized by said preload adjuster comprising a spring mount connected to said spring, a guide on which said spring mount is seated and means connected to said guide for adjusting the position of said guide with respect to said housing.

5. The flow control device of claim 4 characterized by said means for adjusting the position of said guide comprising a follower extending through said housing and engageable with a cam manually adjustable from the exterior of said housing.

6. The flow control device of claim 2 further characterized by means for adjusting the preload of said spring in response to the temperature of fluid handled by said flow control device, said preload adjusting means being grounded to said housing for accurate preload adjustment independent of flow through said valve.

7. The flow control device of claim 6 characterized by said temperature responsive means comprising a plurality of bimetallic elements.

8. The flow control device of claim 7 characterized by said metering valve element including first and second fluid reaction surfaces, a first of said surfaces being pressurized by the admission of servo fluid thereagainst, the second fluid reaction surface being pressurized with fluid handled by said flow control device to balance said metering valve element against pressurization of said first fluid reaction surface, said open end of said metering valve preventing pressurization thereof in opposition to the pressurization of said second reaction surface.

9. The flow control device of claim 8 characterized by said second reaction surface communicating with said second end of said pressure regulating element said second reaction surface being pressurized with fluid through said means for providing communication between said corresponding passage and said second end of said pressure regulating element.

* * * * *